Oct. 31, 1961 J. H. WINDISH 3,006,048
SELF-ADJUSTING FASTENER
Filed March 9, 1959
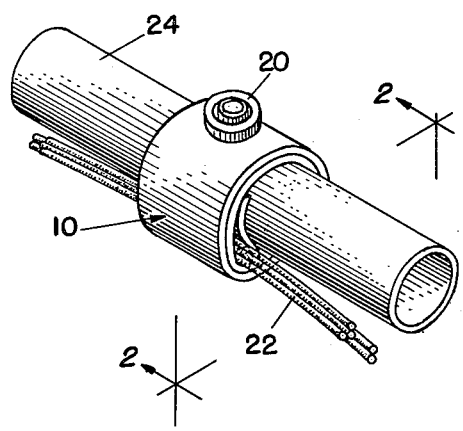
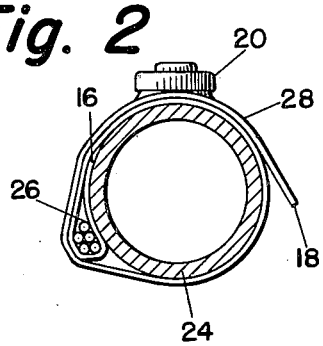
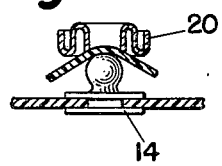
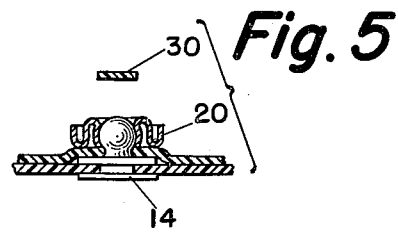
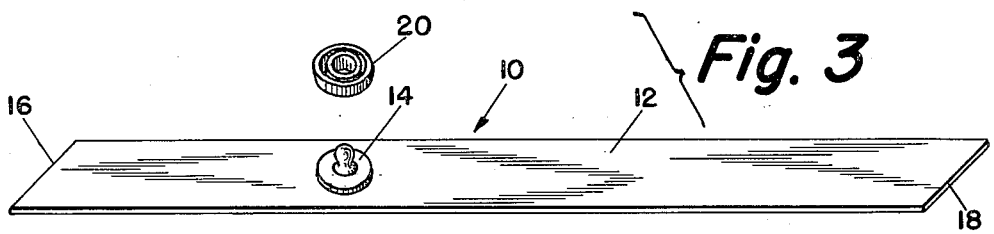
INVENTOR.
JOSEPH H. WINDISH
BY *Arthur H. Seidel*
ATTORNEY 3,006,048
SELF-ADJUSTING FASTENER
Joseph H. Windish, 570 Highland St., Enhaute, Pa.
Filed Mar. 9, 1959, Ser. No. 797,959
2 Claims. (Cl. 24—16)

The present invention is directed to a self-adjusting fastener, and more particularly to a self-adjusting fastener which may be utilized to secure wires and the like to a supporting member such as a pipe.

There has been a long felt need for a self-adjusting fastener for securing wires to tubular supports. In particular, in the aircraft industry there has long been a need for a fastener which could accommodate to various sizes of tubing, and which could secure wire to such tubing without the need for extensive manipulation by the technician making the installation. The use of electrician's tape has been suggested for this usage but the same has been found to be non-desirable because of the adverse effects upon the adhesive portion thereof on aging, and on subjection to the extensive temperature changes encountered with the usage of aircraft.

The present invention has as an object the provision of a novel self-adjusting fastener, and a novel assembly embodying such fastener.

The present invention has another object the provision of a self-adjusting fastener which may be rapidly applied in an installation by unskilled labor.

The present invention has as yet another object the provision of a self-adjusting fastener which can accommodate to a wide variety of support sizes.

The present invention has as a still further object the provision of a self-adjusting fastener which can be made at relatively low cost.

The present invention has as another object the provision of a self-adjusting fastener possessing a great degree of strength and durability.

The present invention has as a still further object the provision of a self-adjusting fastener which can resist relatively large temperature changes.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

FIGURE 1 is a perspective view of an assembly comprising the self-adjusting fastener of the present invention.

FIGURE 2 is a section taken on line 2—2 of FIGURE 1.

FIGURE 3 is an exploded view of the self-adjusting fastener of the present invention.

FIGURE 4 is a sectional view revealing the first stage of the application of the female snap fastener member to the male snap fastener member of the self-adjusting fastener of the present invention.

FIGURE 5 is a sectional view revealing the final stage of the application of the female snap fastener member to the male snap fastener member of the self-adjusting fastener of the present invention, which is the stage which is reached when the self-adjusting fastener of the present invention is locked in secured disposition.

Referring to the drawings, the self-adjusting fastener of the present invention is designated generally by the reference numeral 10. Such self-adjusting fastener 10 is formed from a generally rectangular strip of resilient durable plastic 12. I have found that clear polyvinyl chloride plastic is particularly suitable for this purpose, the twelve thousandths inch thick polyvinyl chloride sheet material possessing excellent strength and resiliency characteristics, and being suitable for almost all installations. While a generally rectangular strip is to be preferred, because of its ease of manufacture and utilization, it is to be understood that the ends of the strip may be pointed or otherwise shaped when so desired.

A male snap fastener member 14 is carried by the plastic strip 12 intermediate the ends of the plastic strip. I have found that for many purposes it is desirable to position the male snap fastener member approximately one-third of the length of plastic strip 12 from one of the ends 16 of the plastic strip 12. Thus, the distance intermediate the end 16 and male snap fastener 14 of the preferred embodiment shown particularly in FIGURE 3 is one-half of the distance intermediate the male snap fastener 14 and the end 18 of the plastic strip 12.

Prior to usage, the female snap fastener member 20 is carried on the male snap fastener member 14 for security reasons only, such female snap fastener member 20 not serving to secure anything in position in the non-use disposition of the self-adjusting fastener 10.

In order to form the assembly shown in FIGURES 1 and 2, which is an assembly in which the wires 22 are supported by the self-adjusting fastener 10 on the copper tubing 24 it is preferable to loop the portion of the plastic strip 12 intermediate the end 16 and the male snap fastener member 14 to form the loop 26 within which the wires 22 are carried. In this fashion, the self-adjusting fastener 10 provides insulation between the wires 22 and the tubing 24, and prevents shorting of a wire through the tubing should such wire's insulation become worn.

The uppermost layer designated 28 in FIGURE 2 comprises the portion of the plastic strip 12 through which the male snap fastener member 14 is extended and which is engaged by the female snap fastener member 20. The portion of the uppermost layer 28 intermediate the so-engaged snap fastener members 14 and 20 and the end 18 comprises a freely dependent tail.

The usage of the self-adjusting fastener 10 of the present invention is as follows:

The plastic strip 12 is looped about the wires 22 to form the loop 26. The loop 26 is then juxtaposed to the outermost surface of the tubing 24 with the end 16 thereof adjacent the tubing 24. The plastic strip 12 is then pulled tightly about the tubing 24, and then down over the male snap fastener member 14, the user holding the portion of the plastic strip 12 adjacent the end 18 during this wrapping operation. While the uppermost layer 28 is taut above the male snap fastener member 14 as shown particularly in FIGURE 4, the female snap fastener member 20 is downwardly urged over the head of the male snap fastener member 14. This results in the removal of a circular disc 30 of plastic, which is punched out by the engagement between the male snap fastener member 14 and the female snap fastener member 20.

The self-adjusting fastener of the present invention may be rapidly applied by unskilled persons to a wide variety of installations, with virtually fool-proof results. Since the plastic strip 12 substantially resists all ambient conditions which are encountered with most normal installations, the assemblies produced with the self-adjusting fastener of the present invention are virtually free from failures due to corrosion, temperature changes, humidity, etc. which beset assemblies comprising fasteners which are dependent upon metal straps or adhesives.

The self-adjusting fasteners of the present invention may be colored, so as to permit color coding or blending with a particular assembly, or the plastic strips may be formed from transparent or translucent material.

The self-adjusting fasteners of the present invention are light in weight, which accords them a particular advantage in aircraft and missile installations.

In the following claims the term "free female snap fastener member" is to be construed as meaning a female snap fastener member which is not permanently secured to any material, such as the female snap fastener member 20 shown in FIGURE 3, and which is only operatively engaged with the male snap fastener member.

The present invention may be embodied in other specific forms without departing from the spirit or essential attributes thereof and, accordingly, reference should be made to the appended claims, rather than to the foregoing specification as indicating the scope of the invention.

I claim:

1. A self-adjusting fastener comprising a strip of resilient imperforate perforatable plastic material, a male snap fastener member, means solely on said male snap fastener member fixedly securing said member to said strip of material, a discrete free female snap fastener member operatively associated with said male snap fastener member, said male and female members having cooperating structure for perforating said strip of plastic material at a point on said strip of plastic material remote from the point at which said securing means fixedly secures said male member to said strip of material as said female member is engaged with said male member to form a closed loop of said strip of material.

2. In an assembly where at least one wire is carried on a support and secured thereto with a self-adjusting fastener, said fastener comprising a single strip of resilient plastic material, a male snap fastener member, means fixedly securing said member to said strip of material, a discrete free female snap fastener member operatively associated with said male snap fastener member, said members having cooperating structure for perforating said strip of material at a point spaced from said securing means as said female member is engaged with said male member while said strip of material extends tightly around said support and wire to form a closed loop with said wire intermediate a portion of said strip of material and said support, and with said strip of material being capable of being maintained in its operatively wrapped disposition solely by the operative engagement of said male and female members.

References Cited in the file of this patent

UNITED STATES PATENTS

| | | |
|---|---|---|
| 1,583,472 | King | May 4, 1926 |
| 2,043,321 | Fleischer | June 9, 1936 |
| 2,373,328 | Morehouse | Apr. 10, 1945 |
| 2,759,390 | Edwards | Aug. 21, 1956 |
| 2,901,796 | Hope | Sept. 1, 1959 |

FOREIGN PATENTS

| | | |
|---|---|---|
| 796,811 | Great Britain | June 18, 1958 |
| 997,278 | France | 1951 |